United States Patent [19]
Johnson

[11] Patent Number: 5,646,502
[45] Date of Patent: Jul. 8, 1997

US005646502A

[54] EMERGENCY LIGHTING CIRCUIT FOR SHUNT-REGULATED BATTERY CHARGING AND LAMP OPERATION

[75] Inventor: James C. Johnson, Conyers, Ga.

[73] Assignee: NSI Enterprises, Inc., Atlanta, Ga.

[21] Appl. No.: 519,804

[22] Filed: Aug. 28, 1995

[51] Int. Cl.⁶ ............................................. H01M 10/46
[52] U.S. Cl. ........................... 320/5; 320/49; 307/66
[58] Field of Search .................... 320/5, 30, 49, 320/51, 54, 55, 57; 307/66

[56] References Cited

U.S. PATENT DOCUMENTS

| | | | |
|---|---|---|---|
| 4,216,410 | 8/1980 | Feldstein | 307/66 X |
| 4,223,232 | 9/1980 | Bulat | 320/9 X |
| 4,454,452 | 6/1984 | Feldstein | 307/66 |
| 4,890,004 | 12/1989 | Beckerman | 307/66 |
| 5,302,858 | 4/1994 | Folts | 307/66 |

OTHER PUBLICATIONS

Ferranti Interdesign, Inc. "201 Analog IC Designs"1980. p. 33.

*Primary Examiner*—Edward Tso
*Attorney, Agent, or Firm*—Kenneth E. Darnell

[57] ABSTRACT

Battery charging circuits configured as a combination of current limited charging sources and a shunt regulating path to bypass current from a battery charging path through a low impedance path so that charge current can be regulated and terminated or controlled, the invention further includes combination of the circuits in emergency lighting systems utilizing conventional AC mains power in a non-emergency mode and DC battery power in an emergency mode, the battery being charged with regulation of charge current effected by said circuits when in the non-emergency mode. In the present circuits, current is by-passed from that portion of the circuit used for battery charging by provision of a low impedance alternate path through which current may also be supplied to non-emergency lamps, the alternate path supplanting prior art circuits which function by continuously turning a single path on and off for charge regulation. In primary embodiments, the circuits use the charging path to also drive the non-emergency lamps. Current through the alternate shunt regulating path drives the non-emergency lamps in the normal non-emergency mode without passing of the current through the battery.

45 Claims, 4 Drawing Sheets

EMERGENCY LIGHTING CIRCUIT FOR SHUNT-REGULATED BATTERY CHARGING AND LAMP OPERATION

BACKGROUND OF THE INVENTION

1. Field of the Invention

The invention relates to circuits for charging of a battery and particularly a battery of an emergency lighting system, the circuits providing a low impedance alternate current path for operation of lamps in a non-emergency mode once battery charging is complete.

2. Description of the Prior Art

Conventional emergency lighting systems which utilize one or more batteries for DC operation (or chopped AC or other AC derived from DC battery operation) require charging of the batteries with AC power derived from conventional AC mains. Battery charging systems used in emergency lighting systems and in other systems vary greatly in capabilities depending upon the requirements of a particular charging application. In most typical applications, battery chargers are designed to charge with a substantially constantly applied voltage. Such chargers use a relatively "stiff" voltage source such as a power transformer in series with a bridge rectifier. Charging circuits of this constant voltage type can allow damage to the voltage source in the event that battery leads are shorted or if the circuit is connected to a severely damaged battery inter alia, an inherent current limiting capability or series impedance being necessary in such a circuit to prevent voltage source damage. However, placement of a series impedance, for example, in a constant voltage battery charging circuit will cause tapering of the charge current as the voltage of the battery increases, thereby causing less voltage to be present across the series impedance. The practice of providing such a series impedance is actually counterproductive since the voltage source must be designed to handle maximum charging currents and to achieve maximum capacity within a reasonably short time. For these reasons, constant voltage charging systems are typically designed to maintain a high charging rate until the battery is fully charged. In the systems designed for maintenance of a high current rate, a short circuit or damaged battery condition creates a highly dissipative condition in which the source voltage drops across the series impedance. The use of current limited transformers designed to alleviate these problems still results in a sufficiently dissipative condition as to create a severe design limitation. For the reasons thus provided, prior art battery charging systems commonly employ large heat sinks on series pass elements and even incorporate voltage regulators having thermal overload protection. Even under optimum conditions, the voltage regulators drop three to four volts across the terminals of the regulators at the desired charge current level, thereby resulting in losses (heat) which must ultimately be dissipated within the confines of the charger housing. Certain types of batteries further require more than one charge level. Batteries may also require charge termination or charge control such as a "trickle" charge. In such situations, the initial charge current may necessarily be much higher than the charge required to maintain a fully charged state. Once a battery is fully charged at the high initial level, it becomes necessary to drastically reduce or terminate the charge current in order to prevent battery degradation.

Prior battery charging systems are common in the art and include circuits such as the battery charging circuit of Bulat described in U.S. Pat. No. 4,223,232 which utilizes a single active element to regulate DC voltage levels from an AC source for battery charging and to power an emergency system upon loss of the AC source. The Bulat circuit also functions to disconnect the battery from the emergency system to prevent deep discharge and resultant battery damage. Feldstein, in U.S. Pat. Nos. 4,216,410 and 4,454,452, charges a battery of an emergency lighting system by means of a rectifier charging circuit operating in series with lamp current, the battery charging current being limited. On failure of AC power, the lamp is isolated from the AC line and operated by an inverter drawing power from the battery. In U. S. Pat. No. 4,890,004, Beckerman describes a battery charging system utilizing a temperature compensated switched voltage regulator. Folts in U.S. Pat. No. 5,302,858 charges a battery in a backup power system when power is available from the main AC power system through utilization of the main power transformer and the main inverter.

The prior art as represented by the aforesaid patents and by the battery charging circuits and systems generally described exhibit serious deficiencies in function and maintenance for which the industry has experienced a long-felt need for remedy thereof. Such remedy is provided by the battery charging circuits of the present invention which minimize circuit losses and thereby eliminate the need for large heat sinks or thermally protected devices. The reduction in losses (heat) thereby act to improve component life by allowing the circuit components to operate at reduced ambient temperatures. This ability to allow operation at reduced temperatures acts in some situations to reduce or eliminate product discolorations which can occur due to long term heating affects experienced in emergency products such as exit signs and the like. The present circuits also provide a battery charging system capable of maintaining a high charge level until the battery is fully charged and to then shunt the current from the charge path to a low impedance path for operation of non-emergency system lighting while retaining the ability to effect continual charge control.

SUMMARY OF THE INVENTION

The invention provides circuitry intended to charge a battery or batteries and particularly in an emergency lighting system wherein battery charging and operation of lighting occur on the same circuitry. In the circuitry and in the system of a preferred embodiment of the invention, AC line power is simultaneously applied to non-emergency lighting and is also used to charge an energy storage system, that is, a battery, which is used to power emergency lighting, typically DC lamps, on discontinuation of power from the AC mains. The invention utilizes current limited charging sources in combination with a shunt regulating path whereby current is bypassed away from the battery through a low impedance path once battery charging is complete. The circuitry of the invention allows regulation of charge current and termination or control of charge.

The circuitry of the invention provides a charging circuit which minimizes circuit losses with resulting heat build-up thereby eliminating the need for large heat sinks or thermally protected devices. Reduced operating temperatures resulting from this minimization of ambient heating act to improve component life and/or to reduce or eliminate discoloration of product housings and the like as can occur due to long term heating affects. Such product housings are typically formed of "plastic" materials derived from polymeric resins and the like and which are susceptible to degradation in the presence of excessive heat.

The circuitry of the invention is configured to provide a high charge level until the battery is fully charged, current then being shunted through a low impedance path and away from that portion of the circuit having the battery so that the battery is bypassed while non-emergency lighting continues to be operated by AC line power. Charge control, such as trickle charge of the battery to maintain full charge, is inherently effected by the present circuitry. Charge termination can be effected as desired through use of the present circuitry.

Accordingly, it is an object of the invention to provide battery charging circuits such as are utilized in emergency lighting systems operated in emergency mode by means of batteries for charging said batteries at a high charge level until the battery or batteries are fully charged, the circuits then bypassing the battery through a shunt regulated path to thereby regulate charge current and to effect charge control.

It is another object of the invention to provide battery charging circuitry capable of inherently minimizing circuit losses and the resulting heat loading on circuits and other associated components by utilizing current limited charging sources in combination with a shunt regulating path for current bypass of the battery through a low impedance path so that charge current can be regulated and charge termination or control can be readily effected.

It is a further object of the invention to provide an emergency lighting system wherein a battery charging circuit is included for the purpose of maintaining a high battery charge level until the battery is fully charged, the charging circuit then causing current to bypass the battery through a low impedance path so that battery degradation is prevented.

Further objects and advantages of the invention will become more readily apparent from the following detailed description of the preferred embodiments.

DESCRIPTION OF THE PREFERRED EMBODIMENTS

Figure 1:
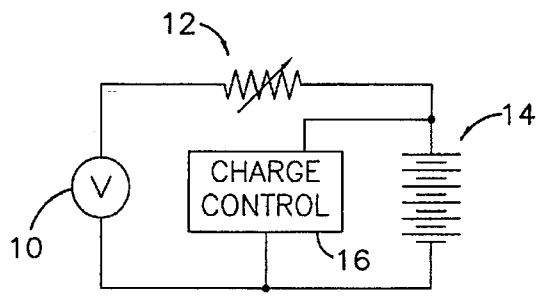
FIG. 1 is a prior art idealized schematic illustrating a basic circuit common to prior art battery charging systems.

Referring now to the drawings and particularly to FIG. 1, an idealized form of the most common type of prior art battery charger is shown to comprise an ideal voltage source 10 in a circuit with a series impedance 12 and a battery 14.

In practice, the voltage source 10 would indeed have a certain internal impedance while the series impedance 12 could take a number of different forms such as transistors, voltage regulators, etc. As is shown in FIG. 1, the series impedance 12 is simply taken to be a resistor for the sake of simplicity. As can be understood from the circuit of FIG. 1, the series impedance 12 cannot simply function as a switch due to the fact that placement of the voltage source 10, as an unlimited voltage source, across a discharged battery or shorted output would short the voltage source 10. Accordingly, charge control 16 is placed in the circuit of FIG. 1, such a charge control function being provided by integrated circuits or by discrete circuitry. Commonly, the charge control 16 in this prior art circuit is unable to distinguish between a battery such as the battery 14 which is simply discharged and a battery which is damaged and has a shorted cell or cells. In the latter case, a situation results wherein the charge control 16 maintains a high charge level into a low voltage load, the result being a considerable voltage drop across the series impedance 12 with subsequent substantial heating. In this prior art situation a faulty battery will never charge and the charge control 16 will never detect the fully charged state, with the result being that the heating effect will continue for an indefinite period of time.

Figure 3:
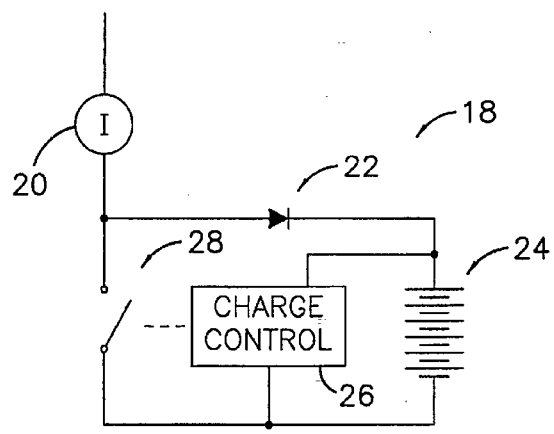
FIG. 3 is an idealized schematic illustrating the basic concept of the present battery charging circuitry.

Considering now the disclosure of FIG. 3 which illustrates an idealized form of the present invention, the basic teachings of the invention can be contrasted to the idealized charger of the prior art as shown in FIG. 1. In FIG. 3, a circuit 18 is shown to be provided with an ideal current source 20 having a single diode 22 disposed in series in the circuit 18 between the current source 20 and a battery 24. The diode 22 functions as a blocking device to prevent discharge of the battery 24 when shunt switch 28 is conductive. Flow of current from the battery 24 is thus blocked when current passes through the shunt switch 28. It is to be understood that the diode 22 in an ideal representation would best be shown as a polarity dependent switch. However, the salient point in this situation is that the series pass element represented by the diode 22 is not a highly dissipative device and, in fact, negligible losses result from the inclusion of the series pass element represented by the diode 22 in the circuit even in the event of a shorted output. A charge control 26 is also provided in the circuit 18, the charge control function being provided as commonly occurs through the use of an integrated circuit (not shown). The shunt switch 28 is controlled by the charge control 26, charge termination being effected in the circuit 18 by the simple closure of the shunt switch 28. In practice, the shunt switch 28 can take a variety of forms including various types of transistor or thyristor. In attainment of the objects of the invention, however, it is necessary for the element comprising the shunt switch 28 to function as a switch rather than as a variable impedance in order to avoid unnecessary long term heating affects. Such long term heating affects act to contribute to overall product temperatures and to reduce reliability.

FIG. 3 essentially provides an idealized form of a diode, that is, the diode 22, as a switch which works in only one direction, that is, the switch provided by the diode 22 is "on" when current flows to the battery 24 and which is otherwise "off". The shunt switch 28, which could also be referred to as a charge control switch, can readily be provided in discrete form through use of an SCR or a transistor such as a field effect transistor, programmable unijunction transistor or other transistors.

A consideration of FIG. 3 leads to an appreciation that different effective charge levels can be achieved simply by operating the shunt switch 28 in an on/off duty cycle pattern. Since a long period is more likely to be beneficial in such a duty cycle pattern, it is not necessary to use high frequency switching circuitry.

Figure 2:
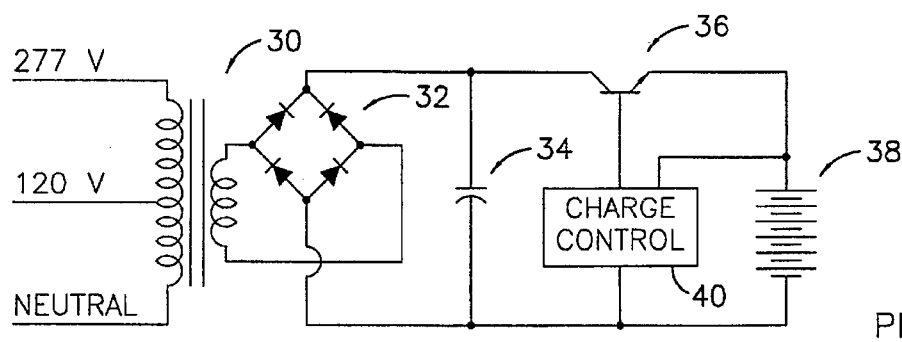
FIG. 2 is a prior art schematic of a practical battery charging circuit common to prior art battery charging systems.

Referring now again to the prior art ideal charging circuit of FIG. 1, it is to be seen when also considering FIG. 2 that a practical prior art implementation of the idealized charger form of FIG. 1 would include a voltage source 30 which would best take the form of a step-down transformer followed by a diode bridge 32 and an electrolytic capacitor 34. While the transformer, bridge and capacitor combination constitutes a common DC power supply, problems are inherent to the utilization of the circuit elements as will be described hereinafter. For the present discussion, it is desirable to complete a view of the circuitry of FIG. 2. A series pass element is provided in the prior art circuit of FIG. 2 in the form of a transistor 36 in series with a battery 38. Charge control 40 is, of course, provided in the prior art circuit.

The prior art charging circuit represented by the circuitry of FIG. 2 functions in a manner which is severely deficient relative to the circuitry of the present invention. A first problem of the prior art circuitry of FIG. 2 derives from input line voltage variation. In essence, the secondary voltage of the voltage source 30, that is, the transformer forming the voltage source 30, must be sufficiently high so as to fully charge the battery 38 even at low line. A higher voltage across the transistor 36, that is, the series pass element represented by the transistor 36, will result in a higher voltage at normal line voltages with even higher voltage drops at high line. In order to counter this undesirable affect, elaborate voltage regulation devices would need to be used and would introduce substantial complexity and cost to the prior art system of FIG. 2.

The prior art system of FIG. 2 inherently exhibits a problem which becomes apparent upon an AC analysis of the circuitry of FIG. 2. With a sinusoidally varying AC input, current will flow into the electrolytic capacitor 34 only during the portion of the cycle when the secondary voltage exceeds the voltage on the capacitor 34. Selection of the form of the capacitor 34 then causes a tradeoff to result whereby a choice exists between a large electrolytic capacitor which creates very short current pulses or a smaller capacitor having a larger conduction angle but which also provides high voltage ripple. In any event, the resulting current waveforms are reflected to the primary of the voltage source 30, thereby producing an undesirable harmonic distortion with resulting poor power factor. The external power grid is impacted and, internally of the circuit, an impact is felt on the size of the voltage source 30 and/or the losses associated with the voltage source 30.

The prior art circuit of FIG. 2 exhibits other problems associate with and inherent to the electrolytic capacitor 34 and to the limited life of such a capacitor. Line current distortions are also present in the circuitry of FIG. 2 since the secondary voltage must exceed battery voltage in order for current to flow to the battery 38. These Inherent problems with the circuitry of FIG. 2 force a circuit designer to encounter certain tradeoffs since increasing the secondary voltage to achieve an improved conduction angle will result in increased losses in the series pass element represented by the transistor 36.

The transistor 36 in the circuitry of FIG. 2 cannot be operated as a switch but must operate as a variable impedance. In the event that an attempt were made to operate the transistor 36 as a switch, no current limit function would be present in the circuitry to protect the circuit from output shorts. While a current limited transformer could be provided in the circuitry of FIG. 2 as the voltage source 30 in an effort to alleviate such inherent problems, substantial costs and complexities are introduced by the incorporation of such a specially constructed transformer, one of these costs being losses in the transformer itself as well as the monetary cost of devices of this nature.

Figure 4:
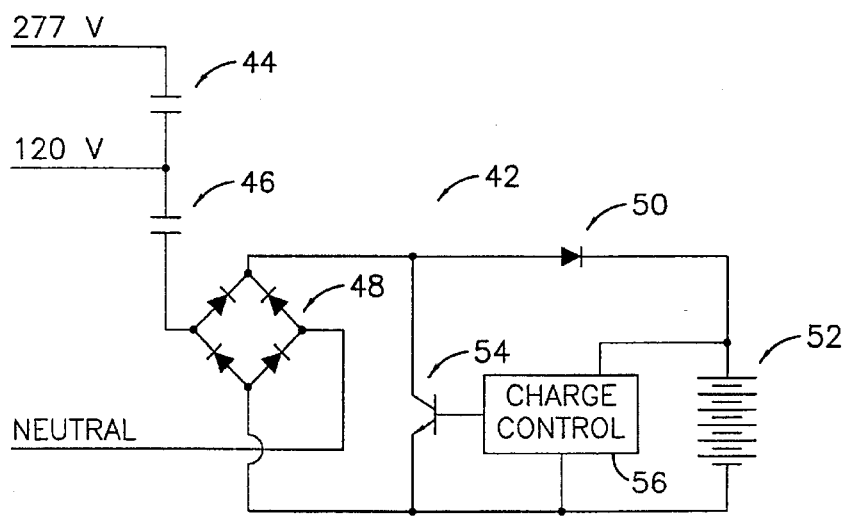
FIG. 4 is a schematic of a basic circuit illustrating the battery charging circuits of the invention.

Referring now to FIG. 4, a practical implementation of the idealized form of the present invention as shown in FIG. 3 can be appreciated particularly in view of the problems inherent in the prior art circuit implementation seen in FIG. 2.

In FIG. 4, a charging circuit 42 representing a basic implementation of the present invention is seen to operate on line voltage, the circuit 42 being arranged to operate either on a voltage of 277 volts AC or 120 volts AC. The respective voltage sources are conventional AC power mains with an AC rated capacitor 46 being operative when the voltage source is taken to be 120 volts AC while both AC rated capacitors 44 and 46 are operative for a line voltage of 277 volts AC. The capacitors 44 and 46 provide excellent constant current source functions since losses associated with the capacitors 44 and 46 are very low. As previously described, the use of transformers for voltage sources results in high operating temperatures in a given system. Through the use of the capacitors 44 or 46, temperatures do not appreciably rise during operation.

In the charging circuit 42 of FIG. 4, a bridge rectifier 48 is provided in series with the capacitor 46 or with the capacitors 44 and 46 and also with a series pass element 50 shown in the drawing as comprising a diode operable in only one direction. The circuit 42 also includes the battery 52 which is to be charged and a shunt switch 54 along with charge control 56. The series pass element 50 is shown as taking the form of a diode which is intended to function as a polarity dependent switch in essentially the manner of the diode 22 of FIG. 3. The shunt switch 54 can take the form of a transistor such as a programmable unijunction transistor or other device as has been described hereinabove relative to the shunt switch 28 of FIG. 3.

The voltage of the battery 52 is inherently low as compared to the input AC voltage of the circuit 42, the battery voltage representing a vectorial addition to the capacitor voltage, that is, the voltage of either the capacitor 46 or the capacitors 44 and 46 depending upon selection of the voltage. Accordingly, the difference in voltage across the capacitors 44, 46 in any charge mode is slight or negligible. The capacitors 44 and 46 thus have a function which can readily be seen to constitute constant current sources since the voltage across either the capacitor 46 or the capacitors 44, 46 remains constant for all practical purposes. This negligible voltage of the capacitor 46 or the capacitors 44,46 also accounts for certain inherent characteristics of the circuit 42, among these characteristics being that the input current flows for a large portion of the AC cycle. Further, even though power factor is leading, harmonic distortion is minimal in the circuit 42.

In battery charging applications wherein the charge level can be low and charge termination is not required, it is recognized that capacitive impedance has previously been utilized for battery charging, such as in the charging of nickle-cadmium batteries. However, in the circuit 42, charge termination and charge control are provided by the shunt switch 54. As previously indicated, the shunt switch 54 preferably takes the form of a shunt transistor which functions as a switch having a high impedance while the battery 52 is charging and a very low impedance state to effect charge termination. On/off duty cycle control can be readily provided to produce intermediate effective charge current levels between the high charge level and full charge termination. The shunt switch 54 embodied in the form of a transistor can take various forms consistent with intended circuit operation. Such devices, when operated as switches, can be embodied as relatively small circuit elements which do not require the extensive heat sinking of circuit components of the prior art since the voltage drop across the shunt switch 54 is minimal.

Figure 5:
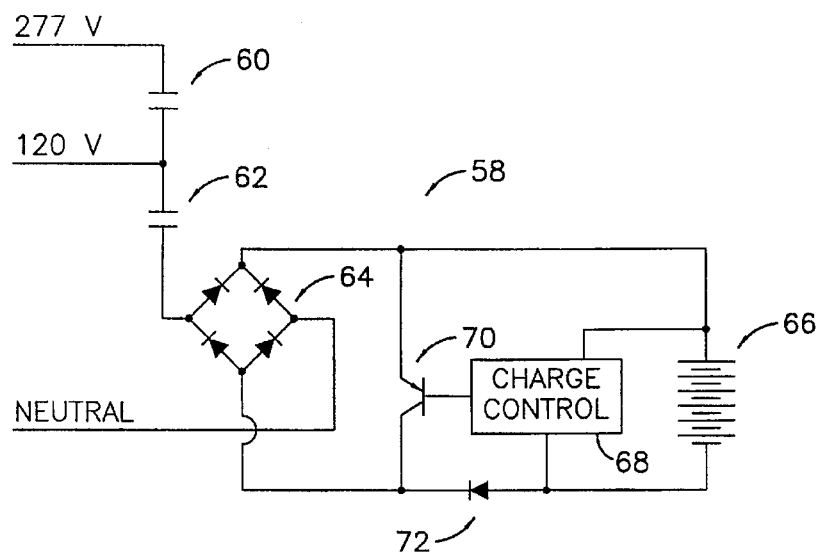
FIG. 5 is a schematic illustrating an embodiment of the invention occasioned by a rearrangement of the circuit components seen in FIG. 4.

Referring now to FIG. 5, another embodiment of the invention represented schematically in FIG. 4 is seen in a rearrangement of the circuit components of FIG. 4. FIG. 5 thus provides a charging circuit 58 operable by selection of AC mains voltages with capacitor 62 and capacitors 60 and 62 respectively acting as constant current sources depending upon the selected voltage. The circuit 58 includes a diode bridge 64 and a battery 66 along with a charge control 68 and a shunt switch 70 in the manner of the circuit 42 of FIG. 4. However, series pass element 72 shown in FIG. 5 as taking the form of a diode operable as a polarity dependent switch is seen to be located in the circuit 58 in the return path rather than the supply path as previously shown in the charging circuit 42 of FIG. 4. This circuit component rearrangement does not materially alter circuit operation even though the series pass element 72, that is, the diode, has been moved to the return path of the circuit 68. As is also seen in FIG. 5, the shunt switch 70 is seen to be a transistor shown as a PNP device. Operation of the charging circuit 58 is identical to the operation of the charging circuit 42 of FIG. 4.

Figure 6:
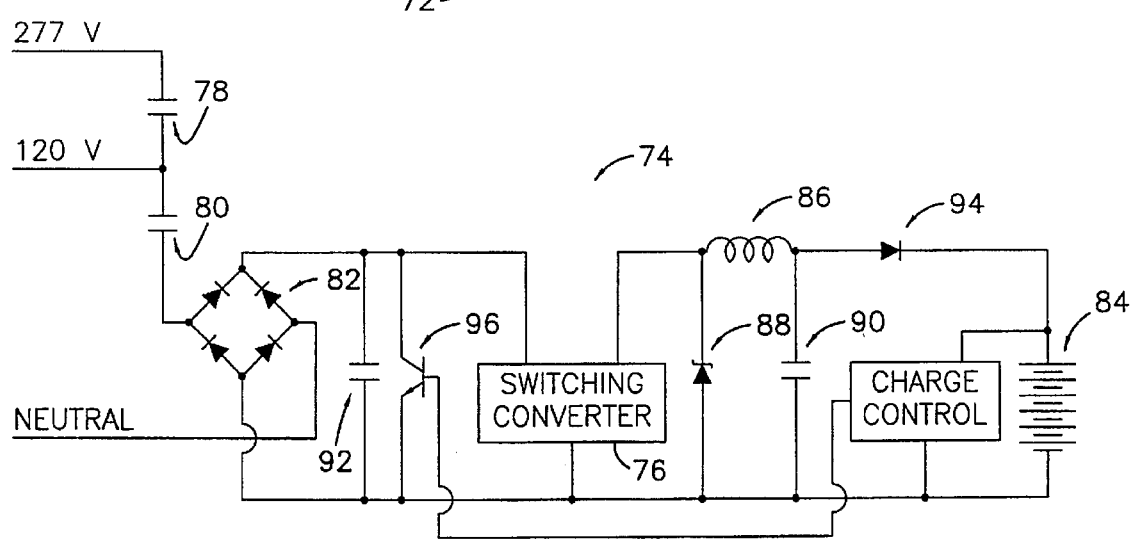
FIG. 6 is a circuit diagram illustrating a low voltage switching power supply present in another embodiment of the invention.

Referring now to FIG. 6, a charging circuit 74 according to the invention is seen to include a low voltage switching converter 76. The low voltage switching converter 76 acts as a power conversion means in its function within the circuit 74 of FIG. 6. The circuit 74 overcomes a previous limitation to the use of AC capacitors to provide a current limiting function, the use of AC capacitors in prior art situations resulting in an increase in size with increased charge current requirements. Accordingly, these prior applications requiring higher charge currents have utilized transformers or off-line switching power supplies. In situations wherein the input must accommodate 277 volts or voltages such as 347 volts, switching power supplies become expensive, complex and more "lossy" due to increased onstate resistance of the power devices and due to increased switching losses caused by high voltage transitions. In contrast, low voltage switching power supplies such as the converter 76 are simple and highly efficient. The combination in the charging circuit 74 of FIG. 6 of a capacitive input with a low voltage switching power supply such as the converter 76 results in the ability to boost charge current by a factor of 10 without increasing AC capacitor size. A representative converter 76 are those devices manufactured by National Semiconductor Corporation under the trademark SIMPLE SWITCHER and designated as Series LM1575/LM1575HV/LM2575/LM2575HV. The step-down voltage regulators known as SIMPLE SWITCHER are monolithic integrated circuits which provide all active functions for a step-down switching regulator and are capable of driving a 1A load with excellent line and load regulation. Either AC capacitor 80 or capacitors 78 and 80, depending upon the selected voltage, function as in the circuits of FIGS. 4 and 5. In the charging circuit 74, most of the input voltage will appear across the capacitor 80 or the capacitors 78 and 80 since a vectorial addition exists of load voltage and capacitor voltage in this circuit. In the charging circuit 74, application of an AC line voltage will result in a DC voltage within bridge rectifier 82 which can easily reach 60 volts on capacitor 92 without materially affecting the voltage on either the capacitor 80 or the capacitors 78 and 80. Sizing of the capacitors 78 and 80 to deliver 100 milliamps coupled with a voltage of 60 volts being present within the diode bridge 82 results in 6 watts of power being delivered to the input of the switching converter 76. Assuming at least 80% efficiency of the converter 76, then 800 milliamps can be delivered to a 6 volt battery 84. The switching converter 76 acts in concert with inductor 86, Schottky diode 88 and capacitors 90 and 92 within the circuit 74 for power conversion, the inductor 86 being a standard coil which is readily available as a discrete component. It is to be understood that the function of the low voltage switching converter 76 could be provided by discrete circuitry or to a desired degree of integration. For simplicity, the SIMPLE SWITCHER manufactured by the National Semiconductor Corporation or a similar device available from other manufacturers is chosen.

The charging circuit 74 in a manner similar to the circuits described hereinabove relative to FIGS. 4 and 5 include a series pass element 94 and a shunt switch 96 as well as a charge control 98. The elements of the circuit 74 of FIG. 6 which are common with the circuit elements of FIGS. 4 and 5 function in a manner similar to the functioning of said common elements in the previously described circuits. It is also to be understood that the switching converter 76 could be integrated into a charge controlled integrated circuit.

The operation of the charging circuit 74 of FIG. 6 is understood to have an input which is effectively current limited by the AC capacitors 78 and/or 80 depending upon the selected voltage. Since the input is current limited, charge termination can be accomplished by clamping at a point within the bridge rectifier 82. In the charging circuit 74, it is preferred that the shunt switch 96 be turned on slowly in order to prevent high current surges as the capacitor 92 is discharged. The particular circuitry of the charging circuit 74 allows the attainment of high charge levels without appreciably increasing the size of the capacitors 78, 80 and without incurring the losses commonly associated with off-line high voltage switching power supplies.

Figure 7:
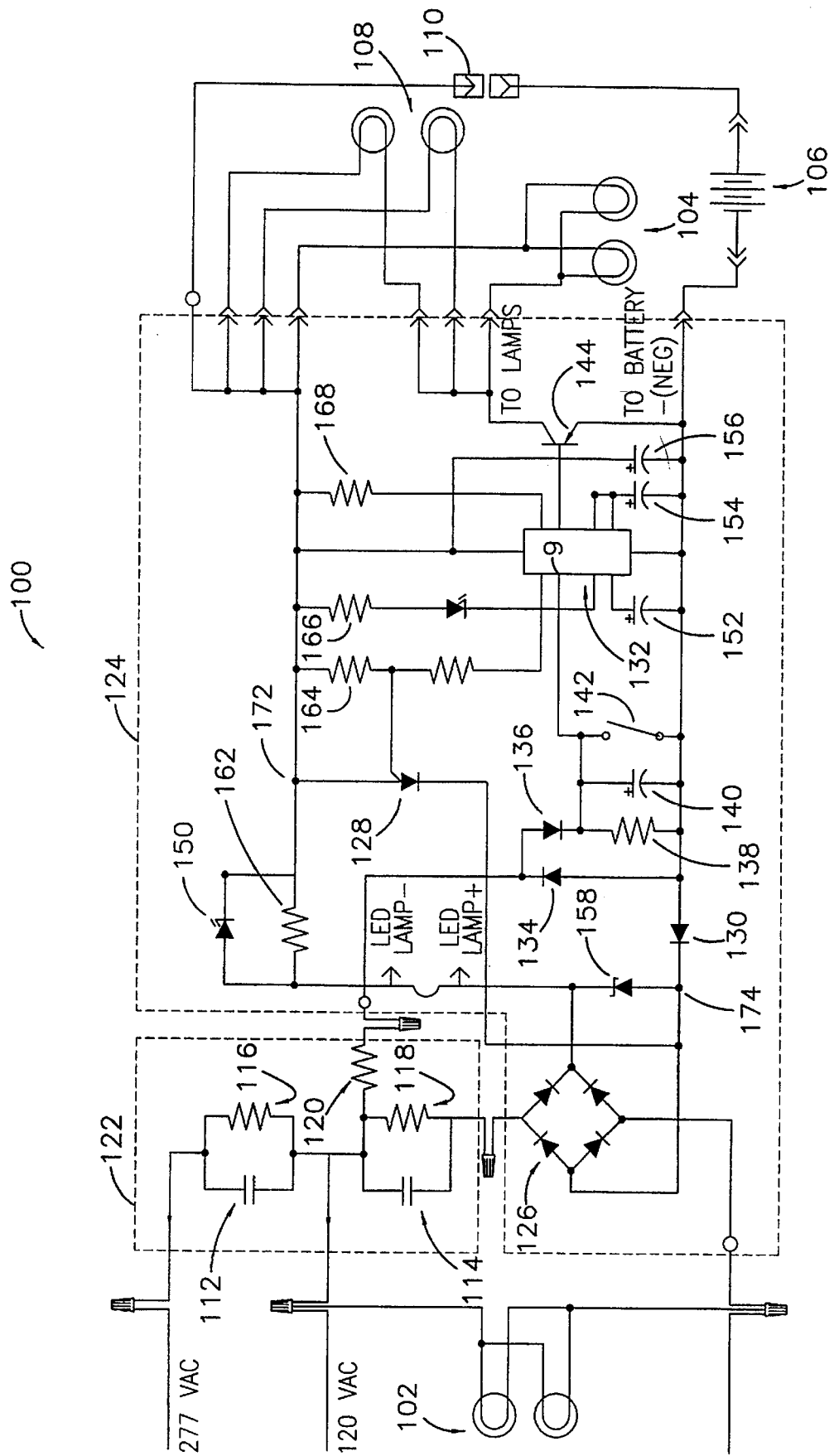
FIG. 7 is a circuit diagram illustrating a preferred embodiment of the invention in an emergency lighting system providing emergency lighting for path of egress and for exit markings.

Referring now to FIG. 7, an improved emergency lighting system is seen generally at 100 to incorporate the charging circuitry of the invention with the system 100 being particularly configured to overcome long term operating losses. The emergency lighting system 100 provides non-emergency lighting through the use of exit lamps 102 operated in a non-emergency mode by AC main power, the main power in the system 100 shown being either 277 VAC or 120 VAC with the voltage being selected for a particular application. As will be described hereinafter, DC power is provided to exit lamps 104 through a battery 106 on failure of mains power. In the system 100, emergency DC power from the battery 106 is used for exit marking through the exit lamps 104 and for path of egress lighting through "unit" DC lamps 108. Battery disconnect can be provided through use of a plug 110.

The system 100 provides AC capacitors 112 and 114, the capacitors 112 and 114 being utilized as a limited current source when the 277 volt source is selected with the capacitor 114 being utilized as a limited current source when the 120 volt source is selected. The capacitors 112 and 114 and associated discharge resistors 116 and 118 as well as a resistor 120 are combined in a discrete circuit element referred to as box capacitor 122. The capacitors 112 and 114 act not only to provide constant current sources as has been previously described but also act to provide an effective voltage divider from which to operate the AC exit lamps 102 from the 277 voltage source.

The remaining circuitry of the system 100 can be conveniently disposed on charger board 124 shown in the dotted outline of FIG. 7. The circuitry on the charger board 124 includes diode bridge 126 and a shunt switch element which takes the form of a programmable unijunction transistor 128. The series pass element of the system 100 takes the form of a diode 130 provided in the return path, the diode 130 acting as a blocking device to prevent discharge of the battery 106. An integrated circuit chip 132 constitutes an application specific integrated circuit manufactured for the present assignee by Motorola, the chip 132 providing a number of functions including a temperature compensated voltage reference from which to accurately determine proper battery float voltage. The integrated circuit chip 132 not only provides the appropriate charge control function but also incorporates logic which turns on the DC lamps 104 and 108 upon loss of AC power and also prevents operation during installation of the system 100 before building power is applied to said system for the first time. Pin 9 of the integrated circuit chip 132 connects to circuitry used to sense the presence or absence of AC power and to accurately detect brownout conditions. The circuitry includes diodes 134 and 136 as well as resistor 138 and capacitor 140, the circuit elements 134, 136, 138 and 140 acting as the "intelligence" which tells the chip 132 whether AC power is applied from the AC voltage sources. This circuitry also provides AC reset and, if no power is present, determines whether power has been applied for the first time. Switch 142 functions as a test switch.

Transistor 144 connects directly to pin 7 of the chip 132 and acts to turn on the DC lamps 104 and 108 which constitute the emergency lighting of the system 100. The transistor 144 is the only element of the system 100 which could require a certain degree of heat sinking due to the heavy loading represented by the lamps 104 and 108. The transistor 144 only operates periodically and with limited duration relative to the capacity of the battery 106, such operation not being long term or continuous.

Figure 8:
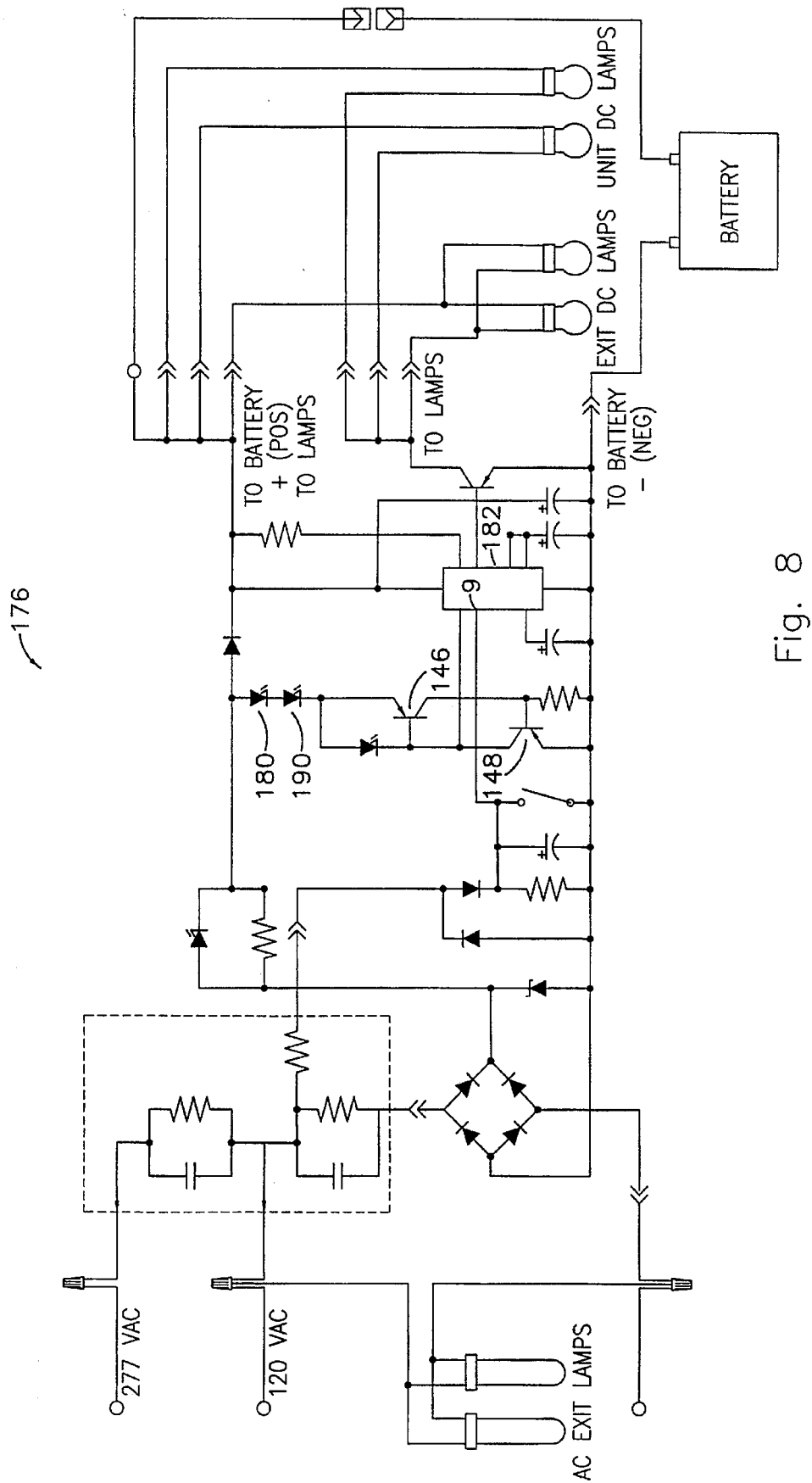
FIG. 8 is a circuit diagram illustrating a further embodiment of the invention.

In FIG. 7, the programmable unijunction transistor 128 comprises the switching function for shunt regulation within the system 100. In FIG. 8 which illustrates a further embodiment of the invention, transistors 146 and 148 provide the switching function, the transistors 146 and 148 being small, inexpensive transistors which take the form as referenced in the art of TO-92 plastic transistors. The diode 180 and diode 190 in FIG. 8 are in the same current path and are used to compensate for offsets present in the integrated circuit chip 182, which chip 182 is identical to the chip 132 of FIG. 7. It is to be understood that the diodes 180 and 190 could be integrated onto the chip 182 thereby allowing the shunt switch comprised of the transistors 146 and 148 to be reduced to a single device. Similarly, the shunt switch comprised of the transistor 128 in FIG. 7 could be integrated onto the chip 132 due to vastly reduced heat losses exhibited by the system 100.

In the system 100 of FIG. 7, capacitors 152, 154 and 156 act to stabilize the circuitry of the system 100, thereby providing a stable reference for stabilization of the operating potential of the integrated circuit chip 132. While this stabilization provided by the capacitors 152, 154 and 156 could be considered to be superfluous, it is believed necessary to address the possibility of having the battery 106 removed under power. Under such a condition, the capacitor 192 would charge rapidly and the shunt device, that is the transistor 128, would clamp the charge current, thereby protecting the integrated circuit chip 132 from excessive voltage. Optimization of the chip 132 for the system 100 reduces dependency upon electrolytic capacitors even to the extent of replacement of the electrolytic capacitor with a film capacitor due to the fact that an electrolytic capacitor of a given size would no longer be necessary.

The system 100 utilizes the capacitors 112, 114 as current limited sources in the preferred circuitry shown in FIG. 7. However, modifications and adaptations of the system 100 are possible within the scope of the invention. As an example, a current limited transformer could be utilized in the event that transformer isolation is desired. A current limited transformer (not shown) could therefore take the place of the capacitors 112 and 114. In such a situation, operation of the shunt switch, that is, the programmable unijunction transistor 128, remains identical. In a likewise fashion, the switching function performed by the transistor 128 could take other forms additional to the form of a bi-polar transistor, examples of devices useful for providing the low impedance path to the common return are field-effect transistors, silicon controlled rectifiers and the like.

Completing the circuitry of the charger board 124, it is to be seen that diode 158 acts as a transient suppressor. Diode 160 functions as a high charge indicator, and the diode 150 can also be seen to indicate that power is in the "on" condition. Resistor 166 constitutes an impedance for the diode 160. When current flows through the diode 150, current will flow through a parallel path which includes resistor 162. Resistors 164 and 170 are provided in the circuit for facilitating supply of the proper voltage and gate current to turn on the programmable unijunction transistor 128. Resistor 168 provides base current through the chip 132 to drive the transistor 144, which transistor 144 turns on the DC lamps 104 and 108. The chip 132 also provides a low battery detect circuit (not shown) which functions as a low voltage disconnect to turn off the transistor 144 to prevent deep discharge of the battery.

Considering operation of the system 100, either of the voltage sources 277 VAC or 120 VAC is selected for operation of the system 100, the AC power coming from this mains source then going through either the capacitor 112 in the case of the 277 VAC or the capacitor 114 in the case of the 120 VAC source. For the sake of simplicity, it will be assumed that the 120 VAC source is selected. The 120 VAC source directly drives the AC exit lamps 102 in the non-emergency mode. Charging of the battery 106 also occurs during at least a portion of the time during which the lamps 102 are operated by the 120 VAC source. When the battery 106 is not in a fully charged condition, the shunt element represented by the programmable unijunction transistor 128 is in an "off" condition with DC current flowing from the diode bridge 126 through the circuit to charge the battery 106. Battery charging occurs with the chip 132 looking at the battery 106 through pin 5 to determine battery condition with control occurring through pin 11. The transistor 128 is always either fully on or fully off but can move between the on and off conditions after full charge in order to float the battery 106. The transistor 128 is "off" during charge and is "on" to float the battery 106 during which operation the battery 106 discharges to a minor degree. The bridge 126 passes DC current to the circuit and through the diode 150 which preferably takes the form of a light emitting diode so that a visual indication is provided that the power is "on". The resistor 162 bypasses at least some of the current since the current in the circuit is too great for the diode 150 alone.

Full charge of the battery 106 is detected as aforesaid, the programmable unijunction transistor 128, that is, the shunt switch element, then turning on to connect points 172 and point 174, thereby providing a bypass path for current which does not include the battery 106.

The circuit 100 of FIG. 7 can be configured differently as referred to hereinabove as is seen in FIG. 8 which illustrates a system 176 which is similar in many respects to the system 100 of FIG. 7. In the system 176, the transistors 146 and 148 function in the same manner as the programmable unijunction transistor 128 of FIG. 7. In essence, the transistors 146 and 148 provide an "off" condition for battery charging and turn on to provide a shunt regulated path through which current flows when battery charging is not desired.

Figure 9:
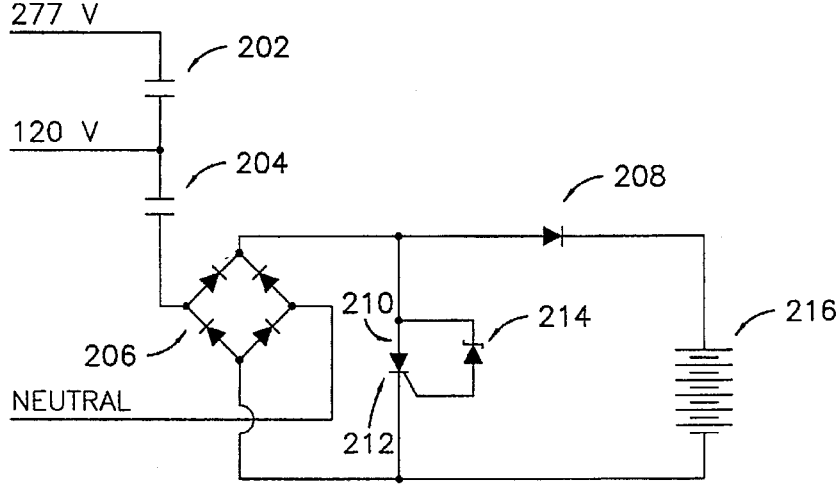
FIG. 9 is a schematic illustrating an embodiment of the invention utilizing a voltage dependent switch.

Referring now to FIG. 9, a simple charging circuit 200 is seen to be operable with two line voltage sources with capacitors 202 and 204 operating as has been described hereinabove. Diode bridge 206 also functions to rectify AC current to DC current in the circuit 200 in a manner such as is described hereinabove. Diode 208 functions as the series pass element while a voltage dependent switch shown generally at 210 as comprising a silicon controlled rectifier 212 and a zener diode 214 acts to control charging and to provide a shunt-regulated current path. The rectifier 212 functions as a shunt switch while the zener diode 214 acts as a voltage sensing device to gate the rectifier 212, that is, to cause the rectifier 212 to become conductive at a selected voltage, thus turning the bypass path "on". The selected voltage is that voltage at which battery 216 is fully charged and at which the battery 216 is "floated".

While the invention has been described in relation to idealized circuitry, several embodiments of simplified practical circuitry and embodiments of systems within which the invention functions, it is to be understood that the invention can be configured other than as is expressly described herein without departing from the intended scope of the invention, the invention being limited only by the recitations of the appended claims.

What is claimed is:

1. In a circuit including a first load operated on AC power and having a battery for providing current to a second load on discontinuation of AC power, the circuit being useful for charging the battery or a cell of the battery, comprising:
    at least one current limited charging means for providing a source of charging current to the battery and for supplying current to the first load;
    means for passing charging current through the battery to charge the battery; and,
    shunt regulated switch means for providing a low impedance circuit path, the low impedance circuit path not including the battery on termination of charging of the battery.

2. In the circuit of claim 1 wherein the current limited charging means comprise at least one capacitor.

3. In the circuit of claim 1 wherein the current limited charging means comprise a capacitance.

4. In the circuit of claim 1 wherein the current limited charging means comprises capacitor means.

5. In the circuit of claim 1 wherein the switch means comprise a programmable unijunction transistor.

6. In the circuit of claim 1 wherein the switch means comprise a silicon controlled rectifier.

7. In the circuit of claim 1 wherein the switch means comprise a field effect transistor.

8. In the circuit of claim 1 wherein the switch means comprise a bi-polar transistor.

9. In the circuit of claim 1 wherein the means for passing current through the battery comprises a series pass element.

10. In the circuit of claim 1 wherein the means for passing current through the battery comprises means for blocking current flow from the battery.

11. In the circuit of claim 10 wherein the blocking means comprise a series pass element.

12. In the circuit of claim 1 and further comprising means for controlling the shunt regulated switch means.

13. In the circuit of claim 12 wherein the controlling means comprise means for sensing battery voltage and for controlling the switch means.

14. In the circuit of claim 1 wherein the switch means comprise a voltage dependent switch.

15. In the circuit of claim 14 wherein the voltage dependent switch comprises a silicon controlled rectifier and a zener diode, the rectifier functioning as a shunt switch and the zener diode acting as a voltage sensing device to gate the rectifier and thus cause the rectifier to become conductive at a selected voltage at which the battery is fully charged and to open the low impedance circuit path at said selected voltage, the voltage dependent switch acting to control charging and to provide a shunt-regulated current path comprised of the low impedance circuit path.

16. In the circuit of claim 1 and further comprising a power conversion means for converting the charging current to a higher level current to charge the battery more rapidly.

17. In the circuit of claim 16 wherein the power conversion means comprises a low voltage switching converter.

18. In the circuit of claim 16 and further comprising means for passing the higher level current through the battery to charge the battery.

19. In the circuit of claim 18 wherein the power conversion means comprise a low voltage switching converter.

20. In the circuit of claim 1 wherein the first load comprises at least one lamp.

21. A circuit useful for charging at least one battery or a cell of a battery, comprising:
    at least one current limited charging means for providing a source of charging current;
    power conversion means for converting the charging current to a higher level current to charge the battery more rapidly;
    means for passing the higher level current through the battery to charge the battery; and,
    shunt regulated switch means for passing current through a low impedance path of the circuit which does not include the battery on termination of charging of the battery.

22. The circuit of claim 21 wherein the power conversion means comprises a low voltage switching converter.

23. The circuit of claim 21 wherein the current limited charging means comprise capacitor means.

24. The circuit of claim 21 wherein the switch means comprise a programmable unijunction transistor.

25. The circuit of claim 21 wherein the switch means comprise a field effect transistor.

26. The circuit of claim 21 wherein the switch means comprise a voltage dependent switch.

27. The circuit of claim 26 wherein the voltage dependent switch comprises a silicon controlled rectifier and a zener diode, the rectifier functioning as a shunt switch and the zener diode acting as a voltage sensing device to gate the rectifier and thus cause the rectifier to become conductive at a selected voltage at which the battery is fully charged and to open the low impedance circuit path at said selected voltage, the voltage dependent switch acting to control charging and to provide a shunt-regulated current path comprising the low impedance circuit path.

28. The circuit of claim 22 wherein the current limited charging means comprise capacitor means.

29. The circuit of claim 22 wherein the switch means comprise a programmable unijunction transistor.

30. The circuit of claim 22 wherein the switch means comprise a field effect transistor.

31. The circuit of claim 22 wherein the switch means comprise a voltage dependent switch.

32. The circuit of claim 31 wherein the voltage dependent switch comprises a silicon controlled rectifier and a zener diode, the rectifier functioning as a shunt switch and the zener diode acting as a voltage sensing device to gate the rectifier and thus cause the rectifier to become conductive at a selected voltage at which the battery is fully charged and to open the low impedance circuit path at said selected voltage, the voltage dependent switch acting to control charging and to provide a shunt-regulated current path comprising the low impedance circuit path.

33. A circuit useful for charging at least one battery, comprising:

a current limited current source;

a series device having a polarity dependent switch function;

a shunt switch comprising a programmable unijunction transistor for providing charge control, the switch passing current through a low impedance path not inclusive of the battery on termination of charging of the battery; and, means for controlling the shunt switch in response to battery voltage level.

34. The circuit of claim 33 wherein the current limited current source comprises capacitor means.

35. The circuit of claim 34 wherein the capacitor means comprises at least one capacitor.

36. A circuit useful for charging at least one battery or a cell of a battery, comprising:

at least one current limited charging means for providing a source of charging current;

means for passing charging current through the battery to charge the battery; and, shunt regulated switch means for passing current through a low impedance path of the circuit which does not include the battery on termination of charging of the battery, the switch means comprising a programmable unijunction transistor.

37. The circuit of claim 36 wherein the current limited charging means comprise capacitor means.

38. A circuit useful for charging at least one battery or a cell of a battery, comprising:

at least one current limited charging means for providing a source of charging current;

means for passing charging current through the battery to charge the battery; and, shunt regulated switch means for passing current through a low impedance path of the circuit which does not include the battery on termination of charging of the battery, the switch means comprising a field effect transistor.

39. The circuit of claim 38 wherein the current limited charging means comprise capacitor means.

40. A circuit useful for charging at least one battery or a cell of a battery, comprising:

at least one current limited charging means for providing a source of charging current;

means for passing charging current through the battery to charge the battery; and, shunt regulated switch means for passing current through a low impedance path of the circuit which does not include the battery on termination of charging of the battery, the switch means comprising a voltage dependent switch.

41. The circuit of claim 40 wherein the voltage dependent switch comprises a silicon controlled rectifier and a zener diode, the rectifier functioning as a shunt switch and the zener diode acting as a voltage sensing device to gate the rectifier and thus cause the rectifier to become conductive at a selected voltage at which the battery is fully charged and to open the low impedance circuit path at said selected voltage, the voltage dependent switch acting to control charging and to provide a shunt-regulated current path comprising the low impedance circuit path.

42. The circuit of claim 40 wherein the current limited charging means comprise capacitor means.

43. In an emergency lighting system having a battery used for providing current in an emergency mode, a circuit useful for charging the battery, comprising:

at least one current limited charging means for providing a source of charging current;

means for passing charging current through the battery to charge the battery; and, shunt regulated switch means for passing current through a low impedance path of the circuit which does not include the battery on termination of charging of the battery, the switch means being selected from the group consisting of a programmable unijunction transistor, a field effect transistor, a silicon controlled rectifier and a voltage dependent switch.

44. In the system of claim 43 wherein the current limited charging means comprise capacitor means.

45. In the system of claim 43 wherein the emergency lighting system has at least one non-emergency lamp operated on AC power, the current limited charging means further supplying power to the lamp.

* * * * *